US008483882B2

(12) United States Patent
Abdallah et al.

(10) Patent No.: US 8,483,882 B2

(45) Date of Patent: Jul. 9, 2013

(54) HIERARCHICAL ROBOT CONTROL SYSTEM AND METHOD FOR CONTROLLING SELECT DEGREES OF FREEDOM OF AN OBJECT USING MULTIPLE MANIPULATORS

(75) Inventors: Muhammad E. Abdallah, Houston, TX (US); Robert Platt, Houston, TX (US); Charles W. Wampler, II, Birmingham, MI (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 686 days.

(21) Appl. No.: 12/686,512

(22) Filed: Jan. 13, 2010

(65) Prior Publication Data

US 2010/0280661 A1 Nov. 4, 2010

Related U.S. Application Data

(60) Provisional application No. 61/174,316, filed on Apr. 30, 2009.

(51) Int. Cl.
*G05B 19/00* (2006.01)
*G05B 15/00* (2006.01)

(52) U.S. Cl.
USPC ........... 700/260; 700/245; 700/261; 700/262; 700/263

(58) Field of Classification Search
USPC .............. 700/245, 260, 261, 262, 263; 901/1, 901/2, 8, 15, 27, 28, 29, 30
See application file for complete search history.

(56) References Cited

U.S. PATENT DOCUMENTS

| | | | | |
|---|---|---|---|---|
| 5,499,320 | A * | 3/1996 | Backes et al. | 700/260 |
| 5,737,500 | A * | 4/1998 | Seraji et al. | 700/251 |
| 7,269,477 | B2 * | 9/2007 | Fukuchi et al. | 700/245 |

(Continued)

OTHER PUBLICATIONS

T. T Wimbock, C. Ott, G. Hirziner, "Impedance behaviors for two-handed manipulation: Design and experiments," I EEE International Conference on Robotics and Automations (ICRA) Apr. 2007, pp. 4182-4189.*

(Continued)

*Primary Examiner* — Khoi Tran
*Assistant Examiner* — Jorge Peche
(74) *Attorney, Agent, or Firm* — Quinn Law Group, PLLC

(57) ABSTRACT

A robotic system includes a robot having manipulators for grasping an object using one of a plurality of grasp types during a primary task, and a controller. The controller controls the manipulators during the primary task using a multiple-task control hierarchy, and automatically parameterizes the internal forces of the system for each grasp type in response to an input signal. The primary task is defined at an object-level of control, e.g., using a closed-chain transformation, such that only select degrees of freedom are commanded for the object. A control system for the robotic system has a host machine and algorithm for controlling the manipulators using the above hierarchy. A method for controlling the system includes receiving and processing the input signal using the host machine, including defining the primary task at the object-level of control, e.g., using a closed-chain definition, and parameterizing the internal forces for each of grasp type.

11 Claims, 2 Drawing Sheets

U.S. PATENT DOCUMENTS

| | | | | |
|---|---|---|---|---|
| 8,260,460 | B2 * | 9/2012 | Sanders et al. | 700/245 |
| 2010/0152898 | A1 * | 6/2010 | Reiland et al. | 700/261 |
| 2010/0198402 | A1 * | 8/2010 | Greer et al. | 700/247 |
| 2011/0067520 | A1 * | 3/2011 | Ihrke et al. | 74/490.05 |

OTHER PUBLICATIONS

M. Koga, K. Kosuge, K. Furuta, K. Nosaki, "Coordinated motion control of robot arms based on the virtual internal model," IEEE Trans. on Robotics and Automation, Feb. 1992, pp. 77-85, vol. 8 No. 1.*

T. Wimbock, C. Ott, G. Hirziner, "Impedance behaviors for two-handed manipulation: Design and experiments," I EEE International Conference on Robotics and Automations (ICRA) Apr. 2007, pp. 4182-4189.*

S. Schneider, R. Cannon, "Object impedance control for cooperative manipulation: Theory and experimental results," IEEE Transactions on Robotics and Automation, 1992, vol. 8 No. 3.*

R B. Bonitz,TC Hsia, "Internal force-based impedance control for cooperating manipulators", IEEE Trans. on Robotics and Automation, vol. 12, No. 1, Feb. 1996.*

T. Wimbock, C. Ott, G. Hirziner, "Impedance behaviors for two-handed manipulation: Design and experiments," IEEE International Conference on Robotics and Automations (ICRA) Apr. 2007, pp. 4182-4189.

R. B. Bonitz, T.C. Hsia, "Internal force-based impedance control for cooperating manipulators", IEEE Trans. on Robotics and Automation, vol. 12, No. 1, Feb. 1996.

* cited by examiner

HIERARCHICAL ROBOT CONTROL SYSTEM AND METHOD FOR CONTROLLING SELECT DEGREES OF FREEDOM OF AN OBJECT USING MULTIPLE MANIPULATORS

CROSS-REFERENCE TO RELATED APPLICATIONS

The present application claims the benefit of and priority to U.S. Provisional Application No. 61/174,316 filed on Apr. 30, 2009.

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to a system and method for controlling one or more humanoid robots having a plurality of joints and multiple degrees of freedom.

BACKGROUND OF THE INVENTION

Robots are automated devices that are able to manipulate objects using manipulators, e.g., hands, fingers, thumbs, etc., and a series of links interconnected via robotic joints. Each joint in a typical robot represents at least one independent control variable, i.e., a degree of freedom (DOF). End-effectors or manipulators are used to perform the particular task at hand, e.g., grasping a work tool or other object. Therefore, precise motion control of the robot may be organized by the level of task specification; object-level control, which describes the ability to control the behavior of an object grasped or held in either a single or a cooperative grasp of a robot, end-effector control, and joint-level control. Collectively, the various control levels achieve the required robotic mobility, dexterity, and work task-related functionality.

Humanoid robots are a particular type of robot having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. The use of humanoid robots may also be preferred where interaction is required with humans, as the motion can be programmed to approximate human motion such that the task queues are understood by the cooperative human partner.

Due to the wide spectrum of work tasks that may be expected of a humanoid robot, different control modes may be simultaneously required. For example, precise control must be applied within the different control spaces noted above, as well as control over the applied torque or force of a given motor-driven joint, joint motion, and/or the various grasp types. Deploying humanoid robots in assembly line tasks requires an ability to interact with unstructured environments and to implement diverse applications.

SUMMARY OF THE INVENTION

Accordingly, a robotic control system and method are provided herein for controlling a robot or multiple robots via a control framework as set forth below. Complex control over a robot, e.g., a humanoid robot having multiple DOF, such as over 42 DOF in one particular embodiment, may be provided over the many independently-moveable and interdependently-moveable robotic joints and object end-effectors or manipulators, or of manipulators of more than one robot simultaneously applying a cooperative grasp on an object. The framework disclosed herein is based on multiple-priority tasks, and therefore is hierarchical in nature. The primary task is defined at the object-level of control, e.g., using a "closed-chain" Jacobian transformation and/or a "closed chain" grasp matrix as explained in detail herein. This provides for a task that commands only select degrees of freedom (DOF) for the object, allowing the other DOF to remain free or unconstrained. This in turn creates an integrated null space that includes not only the redundant DOF of each individual robotic manipulator, e.g., a hand, multiple fingers/thumb, etc., but also the free DOF of the object shared across the various manipulators. The secondary task, on the other hand, may be defined at the joint-level of control, i.e., in the joint space. This multiple-priority control framework offers great functionality for cooperative assembly applications, particularly using a highly complex humanoid robot of the type described herein.

Within the scope of the invention, the controller provides automatic parameterization of internal forces during multiple robot grasp types. Such grasp types may include, by way of example, a cooperative two-hand grasp and a cooperative three-finger grasp of an object. Both possibilities are described in mathematical detail herein.

In particular, a robotic system is provided herein that includes one or more manipulators, whether of a single robot or multiple robots, collectively adapted for grasping an object using one of a plurality of grasp types during an execution of a primary task, and a controller. The controller is electrically connected to the robot(s), and controls the manipulator(s) during execution of the primary task using a multiple-task control hierarchy. The controller automatically parameterizes internal forces of the robotic system for each of the grasp types in response to the input signal, with the primary task being defined at an object-level of control, e.g., using a closed-chain motion transformation in one embodiment.

A controller is also provided for the robotic system noted above. The controller includes a host machine electrically connected to the robot(s), and an algorithm executable by the host machine. The algorithm is adapted to control, when executed, the plurality of manipulators using a multiple-task control hierarchy. Execution of the algorithm automatically parameterizes internal forces of the robotic system for each of a plurality of grasp types of the robot(s), with the primary task being defined at an object-level.

A method for controlling the robotic system as described above includes receiving the input signal via the host machine, and processing the input signal via a multiple-task control hierarchy, using the host machine, to thereby control the plurality of manipulators during the execution of the primary task. Processing the input signal includes: defining the primary task at the object-level of control, and automatically parameterizing internal forces of the robotic system for each of the plurality of grasp types in response to the input signal.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
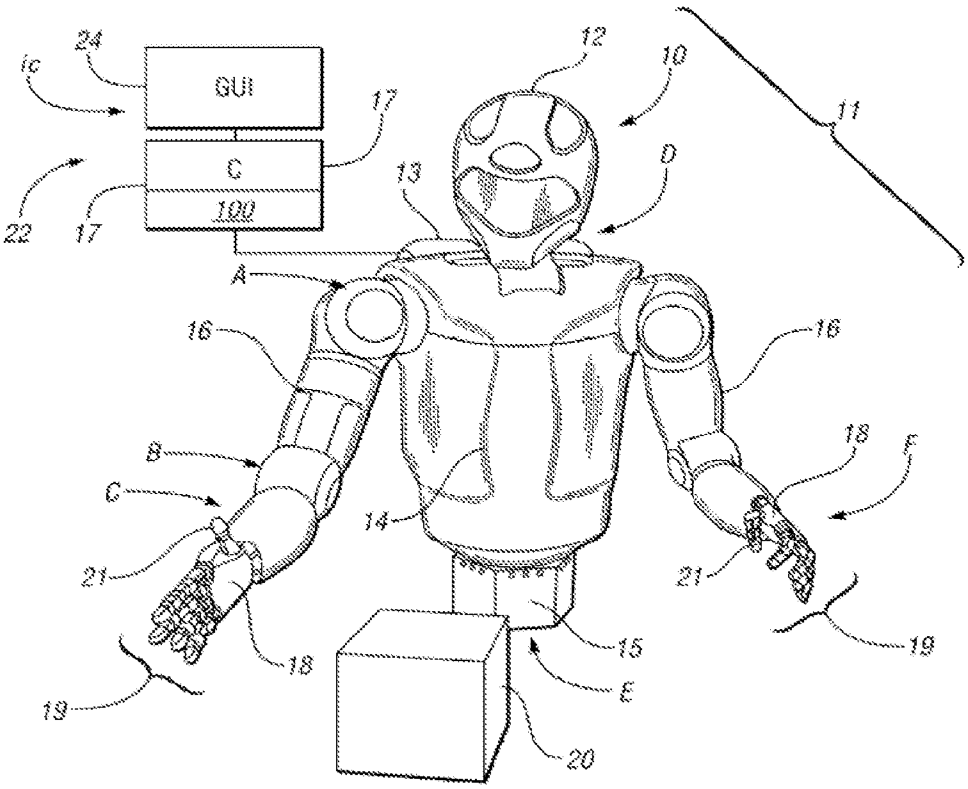
FIG. 1 is a schematic illustration of a robotic system having a robot that is controllable using a hierarchical, multiple-task control framework in accordance with the invention.

With reference to the drawings, wherein like reference numbers refer to the same or similar components throughout the several views, and beginning with FIG. 1, a robotic system 11 is shown having a robot 10, e.g., a dexterous humanoid-type robot, that is controlled via a control system or controller (C) 22. While one robot 10 is shown, the system 11 may include more than one robot as set forth below. The controller 22 is electrically connected to the robot 10, and is adapted for controlling the various end-effectors or object manipulators of the robot 10, as described below, using algorithm(s) 100 suitable for implementing a multiple-task control hierarchy. In this control hierarchy, an impedance relationship may operate, in some embodiments, in a null space at the object-level of control, although the hierarchy is not limited to impedance control. The controller 22 automatically parameterizes internal forces of the system 11 for multiple grasp types of the robot 10 in response to input signals (arrow $i_C$) to the controller 22, and/or generated by or external to the controller. A closed-chain Jacobian motion transformation or task definition, also as described below, may be used to define a primary task of the robot 10 at the object-level of control in one embodiment.

The robot 10 is adapted to perform one or more automated tasks with multiple degrees of freedom (DOF), and to perform other interactive tasks or control other integrated system components, e.g., clamping, lighting, relays, etc. According to one embodiment, the robot 10 is configured as a humanoid robot as shown, with over 42 DOF being possible in one embodiment. The robot 10 has a plurality of independently and interdependently-moveable manipulators, e.g., hands 18, fingers 19, thumbs 21, etc., and including various robotic joints. The joints may include, but are not necessarily limited to, a shoulder joint, the position of which is generally indicated by arrow A, an elbow joint (arrow B), a wrist joint (arrow C), a neck joint (arrow D), and a waist joint (arrow E), as well as the finger joints (arrow F) between the phalanges of each robotic finger.

Each robotic joint may have one or more DOF. For example, certain compliant joints such as the shoulder joint (arrow A) and the elbow joint (arrow B) may have at least two DOF in the form of pitch and roll. Likewise, the neck joint (arrow D) may have at least three DOF, while the waist and wrist (arrows E and C, respectively) may have one or more DOF. Depending on task complexity, the robot 10 may move with over 42 DOF, as noted above. Each robotic joint may contain and may be internally driven by one or more actuators, e.g., joint motors, linear actuators, rotary actuators, and the like.

The robot 10 may include human-like components such as a head 12, torso 14, waist 15, and arms 16, as well as certain manipulators, i.e., hands 18, fingers 19, and thumbs 21, with the various joints noted above being disposed within or between these components. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, or which may be attached remotely through a tethering cable, to provide sufficient electrical energy to the various joints for movement of the same.

The controller 22 provides precise motion control of the robot 10, including control over the fine and gross movements needed for manipulating an object 20 via the manipulators noted above. That is, object 20 may be grasped by the fingers 19 and thumb 21 of one or more hands 18. The controller 22 is able to independently control each robotic joint and other integrated system components in isolation from the other joints and system components, as well as to interdependently control a number of the joints to fully coordinate the actions of the multiple joints in performing a relatively complex work task.

Still referring to FIG. 1, the controller 22 may include multiple digital computers or data processing devices each having one or more microprocessors or central processing units (CPU), read only memory (ROM), random access memory (RAM), erasable electrically-programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 22 or readily accessible thereby may be stored in ROM and automatically executed at one or more different control levels to provide the respective control functionality.

The controller 22 may include a server or host machine 17 configured as a distributed or a central control module, and having such control modules and capabilities as might be necessary to execute all required control functionality of the robot 10 in the desired manner. Additionally, the controller 22 may be configured as a general purpose digital computer generally comprising a microprocessor or central processing unit, read only memory (ROM), random access memory (RAM), electrically-erasable programmable read only memory (EEPROM), a high speed clock, analog-to-digital (A/D) and digital-to-analog (D/A) circuitry, and input/output circuitry and devices (I/O), as well as appropriate signal conditioning and buffer circuitry. Any algorithms resident in the controller 22 or accessible thereby, including an algorithm 100 for executing the hierarchical, impedance-based control framework described in detail below, may be stored in ROM and executed to provide the respective functionality.

The controller 22 may be electrically connected to a graphical user interface (GUI) 24 providing intuitive access to the controller. GUI 24 could provide an operator or programmer with control access to a wide spectrum of primary and secondary work tasks, i.e., the ability to control motion in the object-level, end effector-level, and/or joint space-level or levels of the robot 10. The GUI 24 may be simplified and intuitive, allowing a user, through simple graphical or icon-driven inputs, to control the robot 10 by inputting an input signal (arrow $i_C$), e.g., a desired force or torque imparted to the object 20 by one or more of the aforementioned manipulators, or a desired action of the robot.

In order to perform a range of manipulation tasks using the robot 10, or multiple robots, a wide range of functional control over the robot(s) is required. This functionality includes hybrid force/position control, object-level control with diverse cooperative grasp types, end-effector Cartesian space control, i.e., control in the XYZ Cartesian coordinate space, and joint space manipulator control, and with a hierarchical prioritization of the multiple control tasks. The invention provides for a parameterized space of internal forces to control such a cooperative grasp. It also provides, in one embodiment, for a secondary joint space impedance relation that operates in the null-space of the object 20, as explained mathematically below.

Impedance Law:

The first step of the control framework set forth herein is to characterize the dynamic behavior of the object 20 being acted on by the robot 10, or by two or more robots grasping the same object. This section presents the closed-loop dynamics, with the passive dynamics described later herein. The desired closed-loop behavior may be defined by the following impedance relationship, i.e., equation (1):

$$M_o\ddot{y} + B_o\dot{y} + K_o\Delta y = F - F^*$$

$$\dot{y} \doteq \begin{pmatrix} v \\ \omega \end{pmatrix}$$

In this formula, $M_o$, $B_o$, and $K_o$ are the commanded inertia, damping, and stiffness matrices respectively, where all $\in R^{6\times 6}$. v is the linear velocity of the object 20 center of mass, while ω is the angular velocity of the object. Both are measured with respect to the ground reference frame. F and F* represent the net actual and desired external wrench on the object. Δy is the position error (y−y*). Without loss of generality, the orientation component of y is expressed through an angle-axis representation, as shown in equation (12) below. At equilibrium, where $\ddot{y}=\dot{y}=0$, the impedance relation specifies that the internal force F should be the sum of the nominal force F* and the spring force $K_o\Delta y$. If it is desired for some directions to be pure force control, this may be accomplished by setting the stiffness of those directions to zero in $K_o$. Setting some directions to a pure force control and setting the complementary components of F* to zero, one has a "hybrid" scheme of force and motion control in orthogonal directions.

The redundancy of the manipulators allows for a secondary task to act in the null space of the object impedance. For the sake of this secondary task, a joint space impedance law is defined as follows in equation (2):

$$M_j\ddot{q}+B_j\dot{q}+K_j\Delta q=\tau_f$$

In equation (2) above, $M_j$, $B_j$ and $K_j$ here are the commanded inertia, damping, and stiffness matrices, respectively, for the joint space. q is the column matrix of joint angles for all manipulators in the system. Δq is the joint position error. $\tau_f$ represents the column matrix of joint torques produced by forces acting on the manipulator. These two impedance laws result in the following task objectives for the controller:

$$\ddot{y}^* \doteq M_o^{-1}(F-F^*-B_o\dot{y}-K_o\Delta y)$$

$$\ddot{q}_{ns}^* \doteq M_j^{-1}(\tau_f-B_j\dot{q}-K_j\Delta q)$$

i.e., equations (3), where $\ddot{y}^*$ is the desired object acceleration, and $\ddot{q}^*_{ns}$ the desired joint acceleration for the null space (ns).

Figure 2:
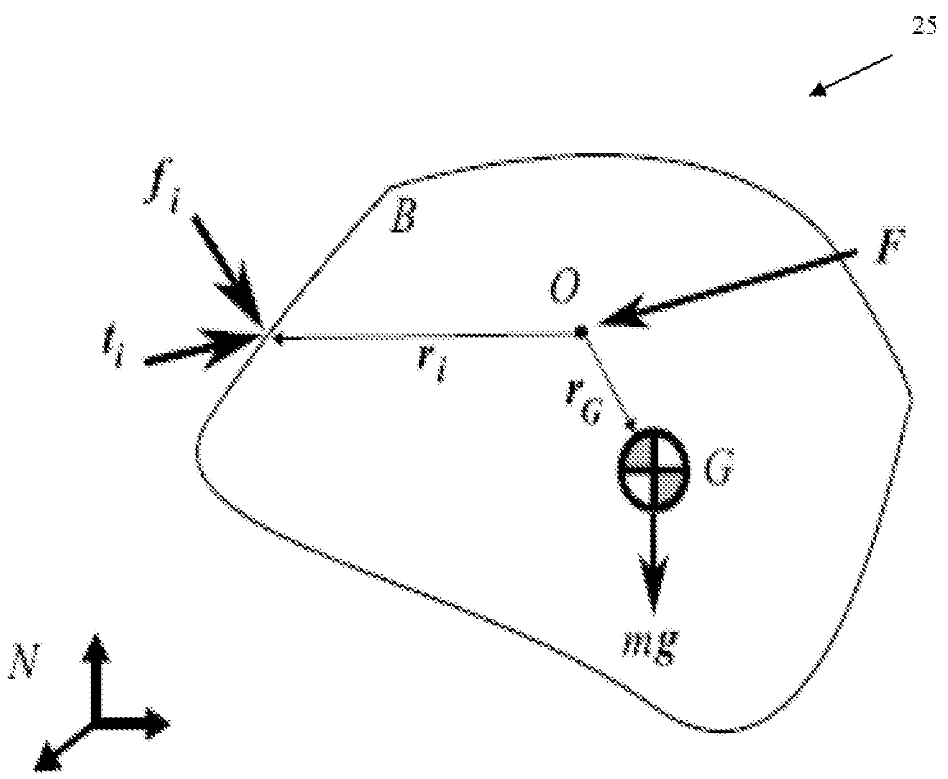
FIG. 2 is a schematic illustration of the various forces and coordinates related to an object that may be grasped by a robot, such as of the type shown in FIG. 1.

Open-Chain Kinematics:

Referring to FIG. 2, the free-body diagram 25 of the object 20 and the coordinate system are shown, with N and B representing the ground and body reference frames, respectively. $r_i$ is the position vector from the center of mass to contact point i, where i=1, . . . , n. $f_i$ and $t_i$ represent the contact force and moment, respectively, from point i. The standard kinematic relationship may be defined for rigid-body accelerations as:

$$\dot{v}_i=\dot{v}+\dot{\omega}\times r_i+\omega\times(\omega\times r_i)+2\omega\times v_{reli}+\alpha_{reli}$$

$$\dot{\omega}_i=\dot{\omega}+\alpha_{reli} \text{ i.e., } \qquad \text{equations (4).}$$

$v_{reli}$ and $\alpha_{reli}$ are defined as the first and second derivatives, respectively, of $r_i$ in the object frame, as shown in equations (5):

$$v_{reli} \doteq {}^B\frac{d}{dt}r_i,$$

$$a_{reli} \doteq {}^B\frac{d}{dt}v_{reli}.$$

These relations can be expressed in matrix form as the familiar grasp mapping. Let x represent the column matrix of end-effector velocities that are constrained by the contact; the exact form of that will follow shortly. Given this definition, the mapping for accelerations follows as equation (6):

$$\ddot{x}=G\ddot{y}+h$$

G is known as the grasp matrix, providing the mapping for the contact information. h is a column matrix of centripetal, coriolus, and relative accelerations. The forms of G and h depend on the grasp type, as discussed below. To map $\ddot{x}$ down to the manipulator space, the following Jacobian matrices are introduced. The linear and rotational Jacobians, $J_{vi}$ and $J_{\omega i}$ respectively, are defined as follows in equations (7):

$$v_i=J_{vi}\dot{q},\quad \omega_i=J_{\omega i}\dot{q}$$

Stacking these submatrices into a composite Jacobian J, where $\dot{x}=J\dot{q}$, the grasp map of equation (6) can be expressed as the following transformation, equation (8), between joint and object accelerations:

$$J\ddot{q}+\dot{J}\dot{q}=G\ddot{y}+h$$

Grasp Types:

In this transformation, the structures of J, G, and h depend on the grasp type. To illustrate, we will consider two grasp types: a Two Hand Grasp, and a Three Finger Grasp. A hand grasp represents a rigid contact that can transfer both arbitrary forces and moments. It thus constrains both the linear and angular motion of the end-effector. The finger contact represents a no-slip, point contact that can only transfer forces. It thus constrains only the linear motion of the end-effector. Accordingly, the matrices take on the following form for each type.

Two Hand Grasp:

$$\dot{x}=\begin{pmatrix} v_1 \\ \omega_1 \\ v_2 \\ \omega_2 \end{pmatrix},\; J=\begin{bmatrix} J_{v1} \\ J_{\omega 1} \\ J_{v2} \\ J_{\omega 2} \end{bmatrix},\; G=\begin{bmatrix} I_3 & -r_1^x \\ 0 & I_3 \\ I_3 & -r_2^x \\ 0 & I_3 \end{bmatrix},\; h=\begin{pmatrix} \lambda_1 \\ \alpha_{reli} \\ \lambda_2 \\ \alpha_{rel2} \end{pmatrix} \tag{9}$$

Three Finger Grasp:

$$\dot{x}=\begin{pmatrix} v_1 \\ v_2 \\ v_3 \end{pmatrix},\; J=\begin{bmatrix} J_{v1} \\ J_{v2} \\ J_{v3} \end{bmatrix},\; G=\begin{bmatrix} I_3 & -r_1^x \\ I_3 & -r_2^x \\ I_3 & -r_3^x \end{bmatrix},\; h=\begin{pmatrix} \lambda_1 \\ \lambda_2 \\ \lambda_3 \end{pmatrix} \tag{10}$$

In these equations, $\lambda_i \doteq \omega\times(\omega\times r_i)+2\omega\times v_{reli}+\alpha_{reli}$. In practice, the relative velocities will be considered negligible and the relative accelerations will consist of closed-loop servos to regulate the internal forces. $I_k$ represents the k×k identity matrix, and $r_i^x$ represents the skew-symmetric matrix equivalent for the cross product of $r_i$ or:

$$r_i^\times \doteq \begin{bmatrix} 0 & -r_{i_3} & r_{i_2} \\ r_{i_3} & 0 & -r_{i_1} \\ -r_{i_2} & r_{i_1} & 0 \end{bmatrix}$$

Closed-Chain Kinematics:

The next step of the present control framework is to map the endpoint DOF down to the manipulator space. For this purpose, we introduce the closed-chain Jacobian. This transformation defines a task that commands only select DOF of the object. The uncommanded DOF are incorporated into the null-space of the primary task. This allows the secondary task to be optimized in a space that includes not only the redundant DOF of each individual manipulator of the robot 10, but also the free DOF of the object shared across the manipulators. It also allows the primary task to operate in an expanded workspace. This may provide a considerable control advantage since the object 20 is now limited to the union of multiple workspaces.

To derive this closed-chain Jacobian, consider the motion constraints between the end-effectors and the object 20. These motion or holonomic constraints provide the link between the object DOF and the manipulator DOF. In a point contact, these constraints apply to position only, akin to a spherical joint. In a rigid contact, the same constraints apply to all six DOF of the end-effector, assuming that no slip occurs. Given the full set of motion constraints, one may then explicitly eliminate the uncommanded DOF of the object 20 to solve for the reduced, independent set of motion constraints. This technique produces relatively simple results that require no extra real-time computation to derive.

Let $\dot{z}$ represent the p DOF of the object to be commanded by the primary task. To this end, one may introduce a constant p×6 matrix S which picks out the directions to control. The relation between the full and reduced sets of DOF, as well as its inverse, follows:

$$\ddot{z}=S\ddot{y} \tag{11}$$

$$\ddot{y}=S^+\ddot{z}+S^\perp\mu \tag{12}$$

Here, $S^+$ is the pseudoinverse of S, $S^\perp$ is a 6×(6−p) matrix spanning the null space of S, and $\mu\epsilon\mathbb{R}^{6-p}$ is arbitrary. The transformation in equation (8) represents the full set of motion constraints between the object and the end-effectors or manipulators, and these constraints contain free parameters. To reduce this set to a minimum set of constraints, the free parameters μ may be eliminated to shift the free parameters to the null space of the task, where they become available to the secondary task of the robot 10.

Substituting equation (12) into equation (8) derives equation (13):

$$J\ddot{q}+\dot{J}\dot{q}=G(S^+\ddot{z}+S^\perp\mu)+h \tag{13}$$

To eliminate μ, find a full-rank matrix E such that $EGS^\perp=0$, i.e., equation (14), where $$E\epsilon\,\mathbb{R}^{(6n+p-6)\times 6n}$$

Eϵ.

Multiplying equation (13) by E provides the reduced set:

$$\begin{aligned} EJ\ddot{q}+E\dot{J}\dot{q} &= EGS^+\ddot{z}+Eh \\ &= EGS^+S\ddot{y}+Eh \end{aligned} \tag{15}$$

Matrix EJ plays a similar role in closed-chain kinematics as the Jacobian matrix usually plays in open-chain kinematics. Therefore, the following matrices may be derived:

$$\hat{J}\doteq EJ,\ \hat{\dot{J}}\doteq E\dot{J},\ \hat{G}\doteq EGS^+S,\ \hat{h}\doteq Eh. \tag{16}$$

This allows for the definition of a final closed-chain transformation:

$$\hat{J}\ddot{q}+\hat{\dot{J}}\dot{q}=\hat{G}\ddot{y}+\hat{h} \tag{17}$$

$\hat{J}$ and $\hat{G}$ are defined as the "closed chain" Jacobian and grasp matrix, respectively.

Consider three task types:

1. Full pose control, where: $S=I_6$, $S^+=I_6$, $S^\perp=\theta$.
2. Orientation-only control, where:

$$S=[0\ \ I_3],\ S^+=\begin{bmatrix}0\\ I_3\end{bmatrix},\ S^\perp=\begin{bmatrix}I_3\\ 0\end{bmatrix}.$$

3. Position-only control, where:

$$S=[I_3,\ \ 0],\ S^+=\begin{bmatrix}I_3\\ 0\end{bmatrix},\ S^\perp=\begin{bmatrix}0\\ I_3\end{bmatrix}.$$

Two-Hand Grasp:

Full Pose:

Since this scenario involves no reduction in DOF, the closed-chain expressions remain unchanged, and:

$$\hat{J}=J,\ \hat{G}=G,\ \hat{h}=h \tag{21}$$

Orientation Only:

The following matrix is a valid annihilator for this scenario:

$$E=\begin{bmatrix} I_3 & 0 & -I_3 & 0 \\ 0 & I_3 & 0 & 0 \\ 0 & 0 & 0 & I_3 \end{bmatrix}$$

Given this E, the closed-chain definitions of equations (16) result in the following matrices for the orientation-only control of a two hand grasp:

$$\hat{J}=\begin{bmatrix} J_{v1}-J_{v2} \\ J_{\omega 1} \\ J_{\omega 2} \end{bmatrix},\ \hat{G}=\begin{bmatrix} 0 & r_2^\times-r_1^\times \\ 0 & I_3 \\ 0 & I_3 \end{bmatrix},\ \hat{h}=\begin{pmatrix} \lambda_1-\lambda_2 \\ \alpha_{rel_i} \\ \alpha_{rel_2} \end{pmatrix} \tag{19}$$

Throughout these scenarios, the form for $\hat{\dot{J}}$ follows $\hat{J}$ directly, where the Jacobian submatrices are simply replaced with their derivatives.

Position Only:

The following matrix is a valid annihilator for this scenario:

$$E=\begin{bmatrix} I_3 & r_1^\times & 0 & 0 \\ 0 & 0 & I_3 & r_2^\times \\ 0 & I_3 & 0 & -I_3 \end{bmatrix}$$

Given this E, the closed-chain definitions of equations (16) result in the following matrices for the position-only control of a two hand grasp:

$$\hat{J} = \begin{bmatrix} J_{v1} + r_1^\times J_{\omega 1} \\ J_{v2} + r_2^\times J_{\omega 2} \\ J_{\omega 1} - J_{\omega 2} \end{bmatrix}, \hat{G} = \begin{bmatrix} I_3 & 0 \\ I_3 & 0 \\ 0 & 0 \end{bmatrix}, \hat{h} = \begin{pmatrix} \lambda_1 + r_1^\times \alpha_{rel_1} \\ \lambda_2 + r_2^\times \alpha_{rel_2} \\ \alpha_{rel_1} - \alpha_{rel_2} \end{pmatrix} \quad (20)$$

Three-Finger Grasp:

In a three-finger grasp scenario, one is dealing with point contacts, and the motion constraints apply only to the position of the endpoints.

Full Pose:

Since this scenario involves no reduction in DOF, the closed-chain expressions remain unchanged, and:

$$\hat{J}=J,\ \hat{G}=G,\ \hat{h}=h \quad (21)$$

Orientation Only:

The following matrix is a valid annihilator for this scenario:

$$E = \begin{bmatrix} I_3 & -I_3 & 0 \\ I_3 & 0 & -I_3 \end{bmatrix}$$

Given this E, the closed-chain definitions of equations (16) result in the following matrices for the orientation-only control of a three finger grasp:

$$\hat{J} = \begin{bmatrix} J_{v1} & -J_{v2} \\ J_{v1} & -J_{v3} \end{bmatrix}, \hat{G} = \begin{bmatrix} 0 & r_2^x - r_1^x \\ 0 & r_3^x - r_1^x \end{bmatrix}, \hat{h} = \begin{pmatrix} \lambda_1 - \lambda_2 \\ \lambda_1 - \lambda_3 \end{pmatrix} \quad (22)$$

Position Only:

This scenario is more challenging, given the difficulty of explicitly eliminating the free variable $\dot{\omega}$ from the set of motion constraints. For this scenario:

$$GS^\perp = \begin{bmatrix} -r_1^x \\ -r_2^x \\ -r_3^x \end{bmatrix} \quad (23)$$

$$r_3 = \alpha r_1 + \beta r_2 + \gamma r_1 \times r_2.$$

Where α, β, and γ are scalars to be solved for in equation (23). E may then be derived as:

$$E = \begin{bmatrix} r_1^T & 0 & 0 \\ 0 & r_2^T & 0 \\ r_2^T & r_1^T & 0 \\ \alpha I3 - \gamma r_2^x & \beta I_3 + \gamma r_1^x & -I_3 \end{bmatrix} \quad (24)$$

Equation of Motion:

Consider again the free-body diagram of FIG. 2. $f_i$ and $t_i$ represent the contact force and moment, respectively, from contact i. The equation of motion can be expressed as:

$$F_{ma} = F + G^T f + m\hat{g} \quad (25)$$

$$F_{ma} \doteq \begin{pmatrix} m a_G \\ I_G \dot{\omega} + \omega \times I_G \omega + r_G \times m a_G \end{pmatrix}, \hat{g} \doteq \begin{pmatrix} g \\ r_G \times g \end{pmatrix}$$

$F_{ma}$ represents the inertial forces, where m is the mass of the object 20 and $I_G$ is the moment of inertia about the center of mass G. $a_G$ is the acceleration of G, and $r_G$ is the position vector from the reference point to G. f is the column matrix of contact wrenches; its form mirrors the form of $\dot{x}$ shown in equations (9) and (10) above. g is the gravity vector.

Internal Forces:

As seen in this equation of motion, the contact forces are mapped to the object space through the transpose of the grip matrix. Accordingly, the internal forces on the object 20 are defined by the null space of $G^T$. To apply the control of internal forces, two qualifies are desired. First, the null space should be parameterized with physically relevant parameters. Second, the parameters should lie in the null space of both grasp types. These requirements are satisfied by the concept of interaction forces. Drawing a line between two contact points, the interaction force is the difference between the two contact forces projected along that line, as is known in the art. Thus, one can parameterize the internal forces of system 10 with the various interaction components.

As described earlier, one may use the relative acceleration terms to control the internal forces. To ensure that these relative accelerations affect only the internal forces and not the external dynamics, they too must lie in the null space of $G^T$. If $\ddot{x}_{rel}$ is the column matrix of relative accelerations, that condition is met when: $\ddot{x}_{rel} \in \aleph(G^T)$. Accordingly, we use the relative accelerations to close a servo loop about the interaction forces. Defining $u_{ij}$ as the unit vector pointing from contact i to j, the magnitude of the interaction force, $f_{ij}$, between those two contacts follows.

$$f_{ij} \doteq (f_i - f_j) \cdot u_{ij} \quad (26)$$

$$u_{ij} \doteq \frac{rj - ri}{\|r_j - r_i\|}$$

We will introduce the interaction acceleration, $a_{ij}$, as a PI regulator on these forces, where $k_P$ and $k_I$ are constant gains.

$$a_{ij} \doteq k_P(f_{ij} - f^*_{ij}) - k_I \int (f_{ij} - f^*_{ij})dt \quad (27)$$

Noting that $u_{ij} = -u_{ji}$ and $a_{ij} = a_{ji}$, the internal acceleration for three contacts can be summarized as follows. For the two contact case, simply set $a_{13}=0$.

$$a_{rel1} = a_{12}u_{12} + a_{13}u_{13}$$

$$a_{rel2} = -a_{12}u_{12} + a_{23}u_{23}$$

$$a_{rel3} = -a_{13}u_{13} - a_{23}u_{23} \quad (28)$$

Since we choose not to control any rotational component, $a_{reli}=0$ for all i.

Control Law:

Using these impedance tasks, motion transformations, and internal forces, the control law may be presented. First, start by modeling the equations of motion for the full system of manipulators:

$$M\ddot{q} + c - \tau_f = \tau. \quad (29)$$

M is the joint space inertia matrix. c is the column matrix of Coriolus, centripetal and gravitational generalized forces, and $\tau$ is the column matrix of joint torques. Assuming that forces act on the manipulator only at the end-effector, $$\tau_f = -J^T f. \tag{30}$$

In preparation for the control law, some unsensed quantities for the object 20 are estimated. First, the external wrench (F) is estimated from the other forces on the object 20. Referring to equation (25), one may employ a quasi-static approximation of the forces.

$$F = -G^T f - m\hat{g} \tag{31}$$

Although included here, the object weight can also be neglected in most cases. In addition, the object velocity can be estimated with the following least-squares error estimate of the system as a rigid body:

$$\dot{y} = G^+ J\dot{q}, \tag{32}$$

where the superscript (+) indicates the pseudoinverse of the respective matrix.

Finally, we present the control law based on the following Inverse Dynamics formulation [12].

$$\tau = M\ddot{q}^* + c - \tau_f \tag{33}$$

$\ddot{q}^*$ in this expression is the commanded joint acceleration. It can be derived from the commanded object acceleration, $\ddot{y}^*$, according to equation (17).

$$\ddot{q}^* = \hat{J}^+(\hat{G}\ddot{y}^* + \hat{h} - \dot{\hat{J}}\dot{q}) + N_{\hat{J}}\ddot{q}_{ns}^*$$

$$N_{\hat{J}} \doteq I - \hat{J}^+\hat{J} \tag{34}$$

$N_{\hat{J}}$ denotes the orthogonal projection operator for the null space of $\hat{J}$ and $\ddot{q}^*_{ns}$ is the vector of accelerations projected into that null space. Using this closed-chain Jacobian, the second task will thus be optimized in a space that includes the free DOF of the object. The two commanded accelerations, $\ddot{y}^*$ and $\ddot{q}^*_{ns}$, are found from the impedance tasks in equation (3).

The explicit control law can be spelled out from equations (33), (34) and (3). Introducing the force estimates in equations (30) and (31), the final control law follows as equation (35):

$$\tau = -M\hat{J}^+\hat{G}M_o^{-1}\left(F^* + B_o\dot{y} + K_o\Delta y + G^T f + m\hat{g}\right) + M\hat{J}^+\left(\hat{h} - \dot{\hat{J}}\dot{q}\right) - MN_{\hat{J}}M_j^{-1}\left(B_j\dot{q} + K_j\Delta q + J^T f\right) + c + J^T f$$

To understand the true behavior of the system, consider the following closed-loop analysis. By noting that $N_{\hat{J}}^2 = N_{\hat{J}}$ and $N_{\hat{J}}\hat{J}^+ = 0$, we obtain the following independent closed-loop dynamics for both the range space and null space of the system.

$$S[\ddot{y} + M_o^{-1}(B_o\dot{y} + K_o\Delta y - \Delta F)] = S[M_o^{-1}F_{ma}] \tag{36}$$

$$N_{\hat{J}}[\ddot{q} + M_j^{-1}(B_j\dot{q} + K_j\Delta q - \tau_j)] = 0 \tag{37}$$

The first relation reveals the desired object impedance task applied to the DOF selected by S. If the impedance matrices are diagonal, the task spaces will remain decoupled. The right-hand side of this relation represents a disturbance from the object accelerations due to the quasi-static estimation of F. This disturbance does not affect the internal forces. The second relation shows that the desired second impedance task is implemented with a minimum-error projection into the null space.

This control law was able to eliminate the need for the object dynamics through two features. First, it introduced the feedback on the end-effector forces. Second, it conducted the transformation from the object space to the end-effector space using accelerations, rather than forces. This method will maintain the internal forces with greater integrity than other control laws that rely on estimates of the object inertia and acceleration. Although the external dynamics will witness the aforementioned disturbance, in our opinion, the infernal forces are the critical factor in cooperative manipulation.

Zero Force Feedback:

Unfortunately, force sensing will not always be available on each end-effector. This section will thus introduce a version of the control law that eliminates the need for the force feedback. The solution presented here, however, does not have the full range of capabilities. It is only applicable to a scenario with full-pose control applied to the Two Hand Grasp. The force feedback terms in the control law (35) can be eliminated by the appropriate selection of the active inertias, $M_o$ and $M_j$. The feedback is eliminated when the coefficients of f sum to zero:

$$J^T - M\hat{J}^+\hat{G}M_o^{-1}G^T - MN_{\hat{J}}M_j^{-1}J^T = 0. \tag{38}$$

Solving for this relation results in the following two conditions:

$$M_o^{-1} = \hat{G}^{\#}(\hat{J}M^{-1}J^T)G^{T\#} \tag{39}$$

$$M_j = M \tag{40}$$

The superscript (#) denotes a generalized inverse of the respective matrix that satisfies $G^{\#}G = I$, such as the class of weighted pseudoinverses. The first condition requires that $\hat{G}$ have full column rank. Hence, this solution is only applicable to the full-pose control case. Given full-pose control, one may make use of the fact that $\hat{G} = G$ and $\hat{J} = J$. A may be introduced as the end-effector space inertia, where $A^{-1} \doteq JM^{-1}J^T$. These results can be interpreted as the active inertias that match the passive inertia. In other words, maintaining the natural inertia of the system eliminates the need for force feedback.

It turns out that these two conditions do not account for the internal force components on the object. Thus, a third condition is introduced to set the internal forces to zero. For the internal space, one may use a pseudoinverse for $G^T$ that is weighted by $A^{-1}$. That weighted pseudoinverse and its corresponding null space projection matrix are defined as follows:

$$G_{A^{-1}}^{T+} \doteq AG(G^TAG)^{-1}$$

$$N_{G^T} \doteq I - G_{A^{-1}}^{T+}G^T \tag{41}$$

This weighted pseudoinverse keeps the object motion from disturbing the internal space. The third condition thus becomes: $N_G^T f = 0$. Due to this condition, this control law is only applicable to rigid grasps, since they do not require internal forces to maintain grip. Accordingly, we will set $G^{T\#} = G_{A^{-1}}^{T+}$ in equation (39).

Applying these three conditions to equation (35), one may derive a zero force feedback control law:

$$\tau_{zff} = -MJ^+A^{-1}G_{A^{-1}}^{T+}\left(F^* + B_o\dot{y} + K_o\Delta y + m\hat{g}\right) + MJ^+\left(\hat{h} - \dot{J}\dot{q}\right) - MN_J M^{-1}\left(B_j\dot{q} + K_j\Delta q\right) + c \tag{42}$$

This expression was simplified by noting that $G_{A^{-1}}^{+}A^{-1}G_{A^{-1}}^{T+} = A^{-1}G_{A^{-1}}^{T+}$ A closed-loop analysis of this control law reveals two independent dynamic relations for the object, the first in the external space and the second in the internal space.

$$(G^TAG)\ddot{y} + B_o\dot{y} + K_o\Delta y = \Delta F \tag{43}$$

$$N_{G^T}(AG)\ddot{y} = N_{G^T}f \tag{44}$$

The first relation reveals the desired object impedance in equation (1), given an inertia that matches the passive inertia. For the second relation, it can be shown that $N_{GT}(AG)=0$ due to the weighted pseudoinverse. Hence, the weighted pseudoinverse filters out the object accelerations from the internal space and in turn produces zero internal forces on the object 20.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:

a robot having a plurality of manipulators collectively adapted for grasping an object using one of a plurality of grasp types during an execution of a primary task having a task space and a null-space, wherein the manipulators have redundant degrees of freedom when grasping the object and the object has a predetermined number of degrees of freedom; and a controller that is electrically connected to the robot, and adapted to control the plurality of manipulators during the execution of the primary task using a multiple-task control hierarchy that includes a secondary task;

wherein the controller:

automatically parameterizes internal forces of the robotic system for each of the plurality grasp types in response to an input signal;

defines the task space of the primary task at an object-level of control as a subset of the predetermined number of degrees of freedom of the object, such that at least some of the predetermined number of degrees of freedom of the object are not commanded for the primary task; and incorporates the degrees of freedom that are not commanded for the primary task into the null-space of the primary task to thereby increase a task space of the secondary task, wherein the task space of the secondary task also includes at least some of the redundant degrees of freedom of the manipulators.

2. The robotic system of claim 1, wherein the robot is a humanoid robot having at least 42 degrees of freedom.

3. The robotic system of claim 1, wherein definition of the primary task at the object-level of control includes using at least one of a "closed-chain" Jacobian transformation and a "closed-chain" grasp matrix.

4. The robotic system of claim 1, wherein the multiple-task control hierarchy utilizes an impedance relationship that operates in the null-space of the object-level of control.

5. The robotic system of claim 1, wherein the controller is adapted to control only a subset of all available degrees of freedom (DOF) of the object using at least some of the plurality of manipulators in a cooperative grasp of the robot.

6. A controller for a robotic system, the robotic system including at least one robot each having at least one manipulator adapted for grasping an object during execution of a primary task having a task space and a null-space, wherein the at least one manipulator has redundant degrees of freedom when grasping the object and the object has a predetermined number of degrees of freedom, the controller comprising:

a host machine electrically connected to the at least one robot; and memory on which is stored an algorithm that is executable by the host machine, where execution of the algorithm by the host machine causes the host machine to control the at least one manipulator of the at least one robot using a multiple-task control hierarchy that includes the primary task and a secondary task;

wherein execution of the algorithm further causes the host machine to:

automatically parameterize internal forces of the robotic system for each of a plurality of grasp types of the at least one robot in response to an input signal; define the task space of the primary task at an object-level of control by commanding a subset of the predetermined number of degrees of freedom of the object, such that at least some of the degrees of freedom of the object are not commanded for the primary task; and incorporate the degrees of freedom of the object that are not commanded into the null-space of the primary task to thereby increase a task space of the secondary task; and wherein the task space of the secondary task also includes at least one of the redundant degrees of freedom of the manipulators.

7. The controller of claim 6, wherein the at least one robot includes a humanoid robot having at least 42 degrees of freedom.

8. The controller of claim 6, wherein definition of the primary task at the object-level of control uses at least one of: a "closed-chain" Jacobian transformation and a "closed-chain" grasp matrix.

9. A method for controlling a robotic system, the robotic system having a robot with a plurality of manipulators collectively adapted for grasping an object using one of a plurality of grasp types during execution of a primary task having a task space and a null-space, wherein the plurality of manipulators has redundant degrees of freedom when grasping the object and the object has a predetermined number of degrees of freedom, and a controller electrically connected to the robot, the controller being adapted to control the plurality of manipulators during the execution of the primary task, the method comprising:

receiving an input signal via a host machine of the controller;

processing the input signal via a multiple-task control hierarchy that includes the primary task and a secondary task, using the host machine, to thereby control the plurality of manipulators during the execution of the primary task;

wherein processing the input signal includes:

defining the task space of the primary task at the object-level of control by commanding a subset of the predetermined number of degrees of freedom of the object, such that at least some of the predetermined number of degrees of freedom of the object are not commanded for the primary task;

automatically parameterizing internal forces of the robotic system for each of the plurality of grasp types in response to the input signal; and incorporating the degrees of freedom of the object that are not commanded into the null-space of the primary task to thereby increase a task space of the secondary task, wherein the task space of the secondary task also includes at least one of the redundant degrees of freedom of the manipulators.

10. The method of claim 9, wherein the plurality of grasp types includes a cooperative grasp type.

11. The method of claim 9, wherein defining the primary task includes using at least one of: a "closed-chain" Jacobian transformation and a "closed-chain" grasp matrix.

* * * * *